THOMAS & MAST.
Grain Drill.
No. 37,712.           Patented Feb. 17, 1863.
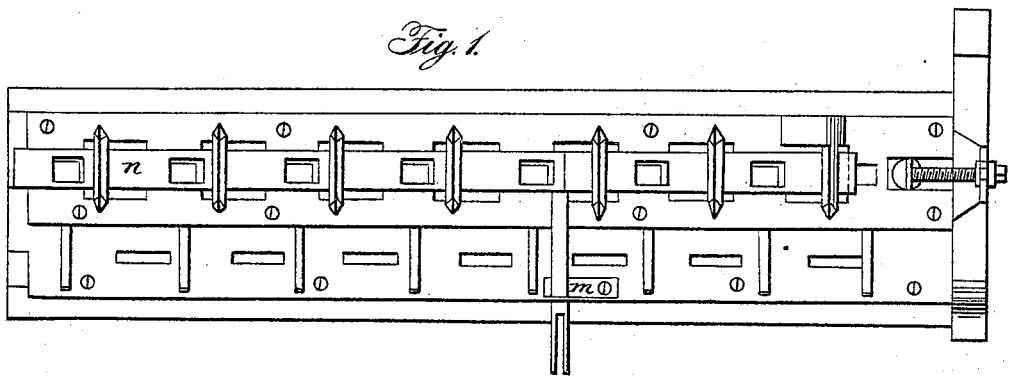
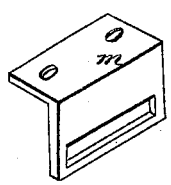
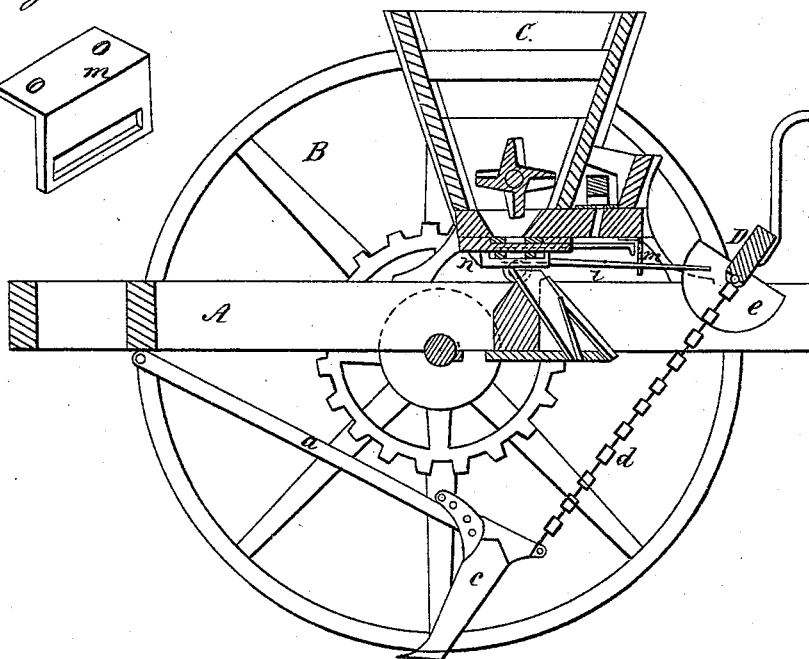
Witnesses:          Inventor:

UNITED STATES PATENT OFFICE.

J. H. THOMAS AND P. P. MAST, OF SPRINGFIELD, OHIO.

IMPROVEMENT IN SEEDING-MACHINES.

Specification forming part of Letters Patent No. 37,712, dated February 17, 1863.

*To all whom it may concern:*

Be it known that we, J. H. THOMAS and P. P. MAST, of Springfield, in the county of Clarke and State of Ohio, have invented certain new and useful Improvements in Seeding-Machines; and we do hereby declare that the following is a full, clear, and exact description of the same, reference being had to the accompanying drawing, and to the letters of reference marked thereon.

In the annexed drawing, making part of this specification, A represents the frame of the machine, which is constructed in any of the known and usual ways, and which is supported upon wheels.

C represents the hopper for the seed. This hopper is provided with a stirrer for the grain and with the usual seed-slides at the bottom for distributing the grain.

n represents the bottom slide, which is the immediate seed cut-off. This slide has rigidly attached to it an arm, i, which has a slot in its outer end. This arm i passes through a guide, m, which is secured to the bottom of seed-hopper. The slotted end of the lever i fits over a cam, e, upon the hinged bar D, which cam is so situated and constructed that when it moves with the bar D it causes the arm i to move laterally, and thus causes the slide n to open or close the seed-openings at the bottom of the hopper. The bar D extends across the back of the frame A and is hinged to it. d represents a chain which connects the bar D to the drill-teeth c.

a represents the drag-bar, which is hinged at its front end to the frame and at its rear end to the drill-teeth c. The chain attaches to a projection at the back of the drill-tooth, while two ears on the front of said tooth straddle the drag-bar and have a wooden pin pass through said ears above the bar. This arrangement of the tooth with the drag-bar is in common use for freeing the drill-tooth by breaking the pin when the tooth strikes any firm obstruction.

It will be readily seen that by the arrangement of parts hereinbefore described that when the bar D is turned in one direction the teeth are raised from the ground, and at the same time the seed is shut off by the slide n. As both the slide n and the teeth are connected to said bar D, it is evident that its movements regulate the movements of the teeth and slide when desirable.

The guide m is very important in its place, for without said guide the arm i would not operate satisfactorily. It would be forced down or up, as the nature of the case might be, by the cam when the bar D was turned and would strain the slide or itself, and not answer the purpose for which it was designed. The bar D is provided with a handle for moving it. The operator by moving this handle opens the seed-discharges and lowers the teeth, or he shuts the seed-discharges and raises the teeth, just as circumstances may require.

Having thus fully described our invention, what we claim as new, and desire to secure by Letters Patent, is—

The arrangement of the guide m in connection with the drag-bars a a, the drill-teeth c c, the chains d d, and the hinged bar D, provided with cam e, used with the seed-slide n, in the manner and for the purpose herein specified.

J. H. THOMAS.
P. P. MAST.

Witnesses:
  GEO. SPENCE,
  WM. H. HAMILTON.